United States Patent

Mack

[15] 3,660,607

[45] May 2, 1972

[54] APPARATUS AND METHOD FOR DETECTING PHASE DEVIATION OF A PILOT SUBCARRIER IN STEREOPHONIC MULTIPLEX BROADCASTING

[72] Inventor: Zdenek Mack, Prague, Czechoslovakia

[73] Assignee: TESLA, narodni podnik

[22] Filed: Apr. 1, 1970

[21] Appl. No.: 24,648

[30] Foreign Application Priority Data

May 16, 1969 Czechoslovakia ....................3486–69

[52] U.S. Cl. ..........................179/15 BT, 325/363, 325/455, 324/83 A, 329/50

[51] Int. Cl. ..........................................................H04h 5/00

[58] Field of Search.................179/15 BT; 325/36, 363, 455; 324/83 A, 83 Q; 329/50

[56] References Cited

UNITED STATES PATENTS

| | | | |
|---|---|---|---|
| 3,538,259 | 11/1970 | Brahman | 179/15 ST |
| 3,328,529 | 6/1967 | Heald | 179/15 ST |
| 3,301,959 | 1/1967 | Jenkins | 179/15 ST |
| 3,257,512 | 6/1966 | Eilers | 179/15 ST |

*Primary Examiner*—Kathleen H. Claffy
*Assistant Examiner*—Tom D'Amico
*Attorney*—Richard Low and Murray Schaffer

[57] ABSTRACT

Method and apparatus for detecting both the magnitude and direction of any deviation in the pilot-subcarrier wave by conventionally separating the pilot carrier, regenerating and shifting its resultant signal by 90° and comparing it with a signal derived from the multiplex signal to produce a signal indicative of the magnitude of deviation. Simultaneously a reference signal is obtained from the original multiplex signal which is in phase with the comparison signal. The deviation signal and the reference signal are then demodulated to produce a directional voltage.

7 Claims, 5 Drawing Figures

Figure 1:
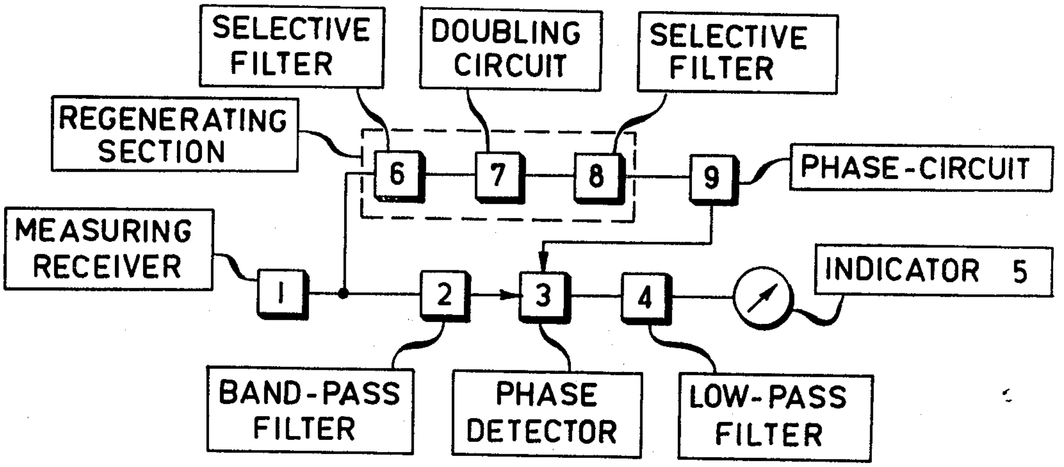

INVENTOR.
ZDENEK MACK
BY
[signature] Atty

INVENTOR.
ZDENEK MACK
BY
Henry Schaff Atty

APPARATUS AND METHOD FOR DETECTING PHASE DEVIATION OF A PILOT SUBCARRIER IN STEREOPHONIC MULTIPLEX BROADCASTING

BACKGROUND OF INVENTION

The present invention relates to stereophonic broadcasting and in particular to apparatus for determining the phase departure of deviation of the pilot-subcarrier.

In stereophonic UHF (Ultra High Frequency) broadcasting transmission of acoustic information is generally carried by mutually adding and subtracting the left and right acoustic signal. The summed stereophonic signal is transmitted in an acoustic band channel of, for instance from 30 Hz to 15 kHz, whereas the difference stereophonic signal is modulated on a subcarrier wave of 38 kHz. The subcarrier itself is suppressed and transmission only of its two side-bands is made. In lieu of the subcarrier wave its subharmonic component (having the frequency of 19 kHz), is transmitted becoming known as the pilot-subcarrier. The complex of all transmitted components (including the summing signal, the two side-bands and the pilot-subcarrier) is called multiplex signal.

In the receiver the pilot-subcarrier is amplified and its frequency is doubled, resulting in regeneration of the subcarrier. The two side-bands are demodulated by means of the regenerated subcarrier resulting in a difference stereophonic signal. By means of both the difference stereophonic signal and the summing signal the left and right signal are then recombined.

In order to obtain a distortion-free modulation signal in the receiver the phase of the regenerated subcarrier must be defined. The phase of the regenerated subcarrier is, of course, dependent on the phase of the pilot-subcarrier and it is therefore necessary to transmit the pilot-subcarrier with an exactly defined phase. The maximum allowance of departure from exact definition being ± 3° for normal operation and less than ±1° for measuring purposes. If the pilot-subcarrier phase deviates beyond the said tolerances, interference such as cross-talk and non-linear distortion arise between stereophonic channels.

It is accordingly most desirable to measure and determine the phase departure of the pilot-subcarrier so that proper adjustment, automatic tuning and other registering circuits be provided.

Conventional measurement of the pilot-subcarrier is first effected by regenerating the pilot-subcarrier and shifting its phase by 90°. The shifted subcarrier wave is then supplied to a phase-detector which is simultaneously supplied with a signal, separated by a band-pass filter, from the multiplex signals. The phase detector produces a voltage which is proportional to the phase difference between the signals supplied to it, although if the signals are 90° apart no output voltage is obtained. The level of the output voltage being of course indicative of the magnitude of the phase deviation. The voltage is fed to a common volt meter where it can be visually or automatically read.

This output voltage, and particularly the voltage as obtained by voltmeter is insensitive to phase direction, being unable to distinguish a positive from a negative signal. Since the phase is not explicit the meter will read a minimum value in the event the phase deviation is 0° or 180°. This insensitivity to phase direction is a severe drawback and disadvantage in checking the operation of the broadcast transmitter and prevents the use of automatic feedback circuit controls compensating for phase departure. Corrective measures must therefore be taken manually and by hit-and-miss tuning.

It is accordingly the object of the present invention to provide apparatus for determining the phase deviation of the pilot subcarrier in stereophonic carrier waves which eliminates the above mentioned drawbacks.

It is an object of the present invention to provide apparatus for detecting phase deviation of the pilot-subcarrier which is indicative not only of its magnitude but of direction.

It is another object of the present invention to provide apparatus for detecting phase deviation of the pilot-subcarrier permitting automatic correction and feedback control.

It is above all the object of this invention to provide an improved method of stereophonic broadcasting.

SUMMARY OF INVENTION

According to the present invention a method and apparatus are provided for detecting both the magnitude and direction of any deviation in the pilot-subcarrier wave by conventionally separating the pilot-subcarrier, regenerating and shifting its resultant signal by 90° and comparing it with a signal derived from the multiplex signal to produce a signal indicative of the magnitude of deviation. Simultaneously a reference signal is obtained from the original multiplex signal which is in phase with the comparison signal. The deviation signal and the reference signal are then demodulated to produce a directional voltage.

According to the preferred form of the invention there is provided a circuit arrangement for determination of the sense of the deviation of the pilot-subcarrier phase comprising a band-pass filter, a phase-detector, a low-frequency band-pass filter and a regenerating part of the subcarrier, after which a phase shifter shifting the phase by 90° connected. The output of the latter being connected to the second input of the phase-detector. A pair of serially arranged low-pass filters are connected to a source of a multiplex signal, the characteristic of the first low-pass filter is chosen as a low-frequency analog to that of the first band-pass filter, and the frequency characteristic of the second low-pass filter is chosen as identical with that low-pass filter which follows after the phase-detector. The second low-pass filter is connected to one input of a balanced demodulator to the second input of which is connected the output of that low-pass filter which follows after the phase-detector. An indicator is connected to the output of the said balanced demodulator.

The balanced demodulator preferably comprises an invertor to which the output of the two serially arranged low-pass filters is connected. The output of the low-pass filters are interconnected with the inputs of that summing circuits, to the second input of which is also connected the output of the low-pass filter which is connected behind the phase-detector.

In a modified form the invertor can be connected to the output of that low-pass filter which is connected to the phase-detector, the output of the serially combined low-pass filters being connected to the second input of the second summing circuit. Each of the outputs of the two summing circuits can be connected via an individual rectifier of the same or of different polarity to an indicator showing in dependence of the phase departure either negative or positive deviation of direction.

Figure 2:
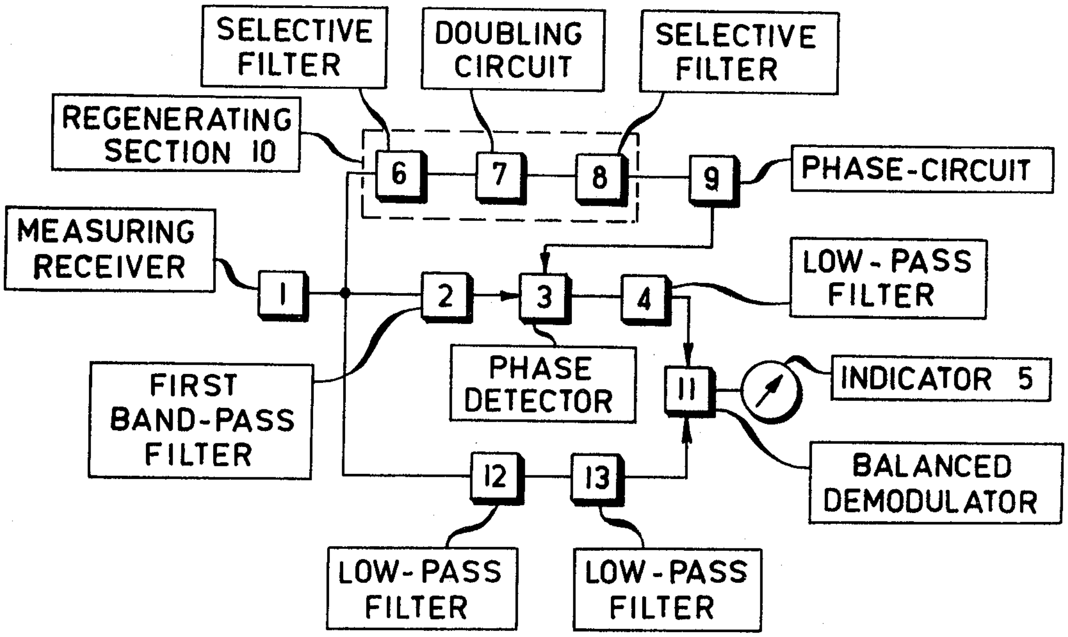
Figure 3:
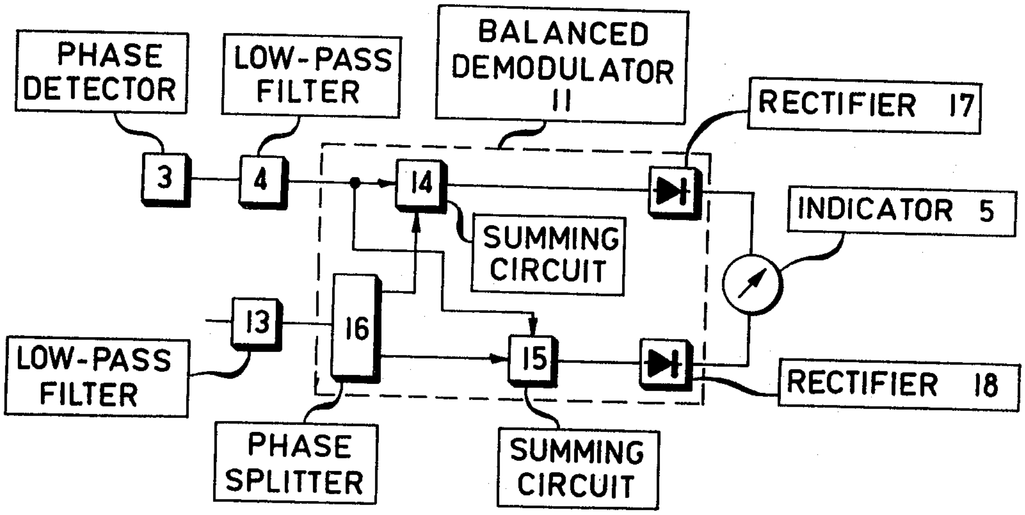
Figure 4:
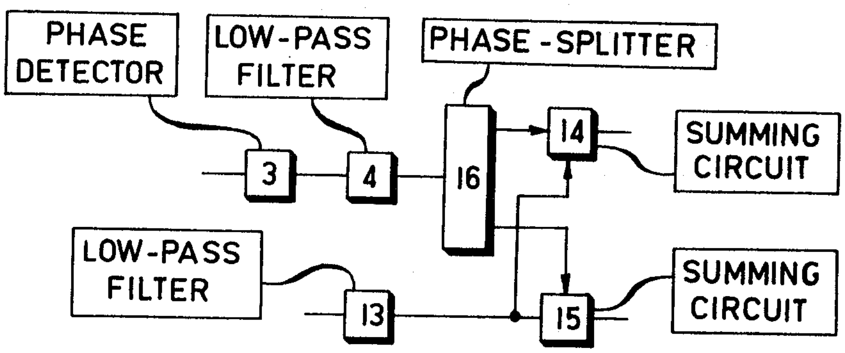
Figure 5:
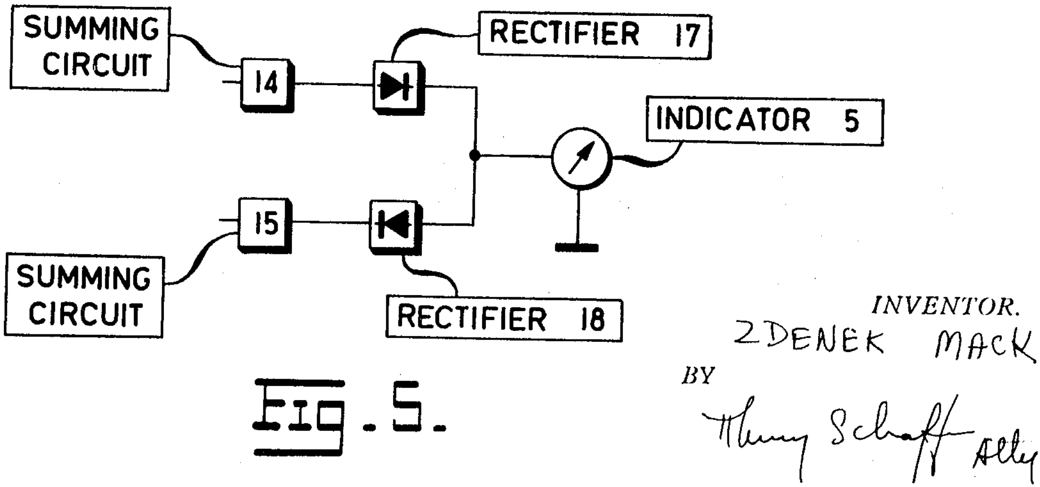

The invention will be understood in its details from the following description in which reference is made to the accompanying drawings in which:

FIG. 1 illustrates in block-diagram the hitherto conventional circuit arrangement for measurement and adjustment of a pilot-subcarrier phase, FIG. 2 illustrates the circuit arrangement for determination of the sense of phase departure of a pilot-subcarrier, in accordance with the present invention, and FIGS. 3–5 show three different circuit arrangements of the balanced demodulator used in connection with this invention.

The measurement and adjustment of the pilot-subcarrier phase as conventionally effected is shown in FIG. 1 and is described here for background purposes only. A multiplex signal is supplied from the output of the measuring receiver 1. The regeneration of the pilot-subcarrier (at 19 kHz) takes place in the regenerating section consisting of a selective filter 6, a doubling circuit 7 and a selective filter 8, in a manner that the pilot-subcarrier is separated from the multiplex signal, its frequency is doubled and selectively filters by filter 8 to obtain a subcarrier of 38 kHz. In the phase circuit 9 the subcarrier is shifted by 90° and supplied to the phase-detector 3 which be means of the band-pass filter 2 is simultaneously fed with a signal represented by the two side-bands of the subcarrier wave.

The phase-detector produces a voltage which is proportional to the phase difference of the two signals supplied from the selective filter 8 and the band-pass filter 2, said voltage being at the same time proportional to the magnitude of the signal supplied from the band-pass filter 2. If these two signals are exactly shifted by 90°, there is no voltage on the output of the phase-detector. If, however, a certain phase difference arises, voltage appears on the output of the phase-detector which while proportional to the value of the difference is an alternating voltage, the level of which represents the magnitude of the information about the phase departure. This voltage is fed via a low-pass filter 4 to a voltmeter 5 which is insensitive to phase direction, where it can be read.

As noted earlier this conventional system suffers from the inability to sense or measure phase direction. According to the present invention a novel circuit is developed which overcomes this defect.

Turning to FIG. 2, the circuit of the present invention includes the regeneration system, generally indicated by the numeral 10, which was conventional in the art and described in connection with FIG. 1 and the pilot-subcarrier is regenerated and fed via phase shifter 9 to the phase-detector 3 in the same manner. Similarly the two side-bands of the subcarrier are supplied via the band-pass filter 2 to the phase-detector 3 where it is compared with the regenerated phase shifted signal, producing an output fed to the low-pass filter 4. Distinguishing from the prior arrangement the novel circuit includes a pair of serially arranged low-pass filters 12, and 13 the first of which is connected to the multiplex signal source 1. The frequency characteristic of the first low-pass filter 12 is with respect to the zero frequency almost the same as that of the band-pass filter with respect to the 38 kHz subcarrier, while the frequency characteristic of the second low-pass filter 13 is identical with the characteristic of the low-pass filter 4.

The output of the serially combined filters 12 and 13 is connected to one input of a balanced demodulator 11, while the second input of which is connected to the output of the low-pass filter 4. The indicator, or voltmeter 5 is connected to the output of the balanced demodulator 11 rather than to the low-pass filter 4.

The balanced demodulator 11 is shown in detail within the lines of FIG. 3. The signal of the two serially connected low-pass filters 12 and 13 is supplied to an invertor 16, the output of which generates a pair of symmetrical signals which are fed to summing circuits 14 and 15. The signal coming from the phase-detector 3 via the low-pass filter 4 is added to each of the summing circuits 14 and 15 and the combined signal is fed to rectifiers 17 and 18, such as diodes or the like, both of which polarized in the same direction. An indicator 5 is connected to the output of each of the two rectifiers 17 and 18 by means of its two terminals respectively.

The novel circuit operates as follows:

The summing stereophonic signal is separated from the multiplex signal by means of the low-pass filters 12 and 13 which due to almost the same characteristics as the filters 2 and 4, respectively produce a summing stereophonic signal having a phase position which is the same as that coming from the low-pass filter 4. The summing stereophonic signal therefore represents a reference signal in the balanced demodulator 11 so that in the absence of signal from the phase-detector 3, (i.e., a zero deviation of the pilot-subcarrier) only the summing signal is fed to the rectifiers 17 and 18 through circuits 14 and 15. Due to the same polarization of the rectifiers 17 and 18 voltage of the same polarity appears behind them and no deviation of the indicator 5 takes place.

In the presence of signal from the phase-detector 3, (i.e. if there exists some phase deviation) the signal to the summing circuits 14 and 15 comprises the combination of the reference stereophonic summing signal and the deviation signal from detector 3. The resulting voltage across the indicator 5 depends on the polarity of the signal arriving from the phase detector 3. If this signal is in phase with the reference summing signal, then the level in the output of the summing circuit 14 increases, while simultaneously the output level of the summing circuit 15 decreases. The pointer of the indicator 5 is thus deviated in positive sense to indicate both magnitude and direction. Should the signal from the phase-detector 3 shift by 180°, then the output of summing circuit 14 decreases and the output of the summing circuit 15 increases oppositely as described above and the pointer of the indicator 5 is deviated in the negative or opposite direction.

While it is preferred that the rectifiers 17 and 18 are unidirectional to exert a balancing signal on the indicator, the same resultant can be obtained if the two units (i.e., diodes ) are pointed in opposite directions. This arrangement is shown in FIG. 5 where the polarization of the rectifiers 17 and 18 are oppositely placed with respect to summing circuits 14 and 15, however their outputs are led in-common to one terminal of the indicator 5, the second terminal of which is grounded. In this manner the summing signals of circuits 14 and 15 are added together and are supplied to the indicator 5 with reference to a fixed ground.

A second modification is also possible as seen in FIG. 4. The circuit arrangement of the balanced demodulator 11 may be modified so that the signal from the phase-detector 3 is supplied via low-pass filter 4 to the inverter 16 and the reference summing signal is supplied directly to the summing circuits 14 and 15.

The present invention removes the aforesaid drawbacks by a circuit arrangement generating voltage, the polarity of which gives an explicit indication of the direction of the phase departure, the value of the voltage being also proportional to the value of the phase departure.

From the foregoing it will be apparent that the present invention provides a suitable method for detecting both the magnitude and direction of any deviation in the pilot-subcarrier wave comprising the steps of conventionally separating the pilot-carrier, regenerating and shift its resultant signal by 90° and comparing it with a signal derived from the multiplex signal itself to obtain a signal indicative of any deviation. Simultaneously a reference signal is obtained from the original multiplex signal which is similar to and is in phase with the comparing signal. The deviation signal and the reference signal are then demodulated to produce a directional voltage.

While the present invention has been described with reference to generally and schematically described components it will be apparent to those skilled in this art that specific sub-circuits and components exist which can readily be applied in the circuitry shown in the drawings. Reference to available texts, such as the International Dictionary of Physics and Electronics, published by D. Von Nostrand Company, Inc., Princeton, New Jersey, can be made for such components circuitry for low-pass filters, band filters, phase-detectors, etc., which for the sake of brevity need not be detailed here.

Many modifications and changes to the form and circuitry of the present invention are possible. Some have been described herein. Accordingly, it is intended that the present disclosure be taken as illustrative only and not as limiting of the invention in any way.

What is claimed:

1. Apparatus for measuring and detecting the magnitude and direction of phase deviation of a pilot-subcarrier wave of a stereophonic multiplex signal comprising, means for regenerating said pilot-subcarrier means for shifting the phase of said regenerated subcarrier 90°, a band-pass filter and a phase-detector serially arranged therewith, said band-pass filter receiving said multiplex signal, said phase-detector receiving said shifted subcarrier signal, said phase-detector producing a signal indicative of the magnitude of phase deviation of said pilot-subcarrier, a first low-pass filter receiving said phase deviation signal, a balanced demodulator receiving said signal from said low-pass filter, a second and third low-pass filter serially arranged with respect to each other, said second low-pass filter having a low frequency characteristic and receiving a signal from said multiplex signal, the third low-pass filter having a frequency characteristic identical with said first lowepass filter and passing its output signal to said balanced demodulator and an indicator receiving the output of said balanced demodulator whereby the direction of said pilot-subcarrier is indicated.

2. The apparatus according to claim 1 wherein the balanced demodulator comprises an invertor, and a pair of summing circuits, said invertor producing a pair of signals fed respectively to said summing circuits, the output of one of said first and third low-pass filters being simultaneously fed to each of said summing circuits.

3. The apparatus according to claim 2 including a rectifier connected to each of said summing circuits, said rectifiers being unipolar and connected across the terminals of said indicator.

4. The apparatus according to claim 2 including a rectifier connected to each of said summing circuits, said rectifiers being of different polarity and connected together to one terminal of said indicator, the other terminal of which is grounded.

5. The apparatus according to claim 2, wherein said invertor is connected to said third low-pass filter and said first low-pass filter is connected to said summing circuits.

6. The apparatus according to claim 2 wherein said invertor is connected to said first low-pass filter and said third low-pass filter is connected to said summing circuits.

7. The method of measuring and detecting the magnitude and direction of phase deviation of a pilot-subcarrier wave of stereophonic multiplex signal comprising the steps of separating said pilot-carrier wave from said multiplex signal, regenerating said pilot-carrier signal, shifting the phase of said regenerated signal 90° and comparing said shifted regenerated signal with a comparison signal derived from said original multiplex signal to obtain a difference signal indicative of the phase deviation of said pilot-carrier wave, simultaneously obtaining a reference signal derived from said original multiplex signal, said reference signal being in phase therewith, demodulating said difference signal and said reference signal to obtain a voltage thereby indicative of the phase direction of said regenerated pilot-subcarrier signal.

* * * * *